(12) United States Patent
Alhammad et al.

(10) Patent No.: US 11,763,428 B2
(45) Date of Patent: Sep. 19, 2023

(54) SYSTEM AND METHOD FOR DE-NOISING AN ULTRASONIC SCAN IMAGE USING A CONVOLUTIONAL NEURAL NETWORK

(71) Applicant: Saudi Arabian Oil Company, Dhahran (SA)

(72) Inventors: Bashaer Abdullah Alhammad, Jubail (SA); Hasan Ali Al-Hashmy, Dhahran (SA); Aziz U. Rehman, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 23 days.

(21) Appl. No.: 17/304,484

(22) Filed: Jun. 22, 2021

(65) Prior Publication Data

US 2022/0405887 A1   Dec. 22, 2022

(51) Int. Cl.
| | | |
|---|---|---|
| *G06T 5/00* | (2006.01) |
| *G06T 5/20* | (2006.01) |
| *G06T 7/00* | (2017.01) |
| *G01N 29/06* | (2006.01) |
| *G06F 18/2137* | (2023.01) |
| *G06F 18/21* | (2023.01) |

(52) U.S. Cl.
CPC ......... *G06T 5/002* (2013.01); *G01N 29/0654* (2013.01); *G06F 18/2137* (2023.01); *G06F 18/2193* (2023.01); *G06T 5/20* (2013.01); *G06T 7/0004* (2013.01); *G06T 2200/24* (2013.01); *G06T 2207/10132* (2013.01); *G06T 2207/20084* (2013.01); *G06T 2207/30144* (2013.01); *G06T 2207/30168* (2013.01)

(58) Field of Classification Search
CPC ......... G06T 5/002; G06T 5/20; G06T 7/0004; G06T 2200/24; G06T 2207/10132; G06T 2207/20084; G06T 2207/30144; G06T 2207/30168; G01N 29/0654; G06K 9/6251; G06K 9/6265
See application file for complete search history.

(56) References Cited

U.S. PATENT DOCUMENTS

| | | |
|---|---|---|
| 5,777,891 A | 7/1998 | Pagano et al. |
| 6,523,411 B1 | 2/2003 | Mian et al. |
| 9,864,931 B2 * | 1/2018 | Kumar ............... G06V 10/7753 |

(Continued)

FOREIGN PATENT DOCUMENTS

| | | |
|---|---|---|
| CN | 108573491 A | 9/2018 |
| CN | 108665456 A | 10/2018 |

(Continued)

OTHER PUBLICATIONS

Munir et al., Convolutional neural network for ultrasonic weldment flaw classification in noisy conditions, Ultrasonics, vol. 94, Apr. 2019, pp. 74-81 (Year: 2019).*

(Continued)

*Primary Examiner* — Andrae S Allison
(74) *Attorney, Agent, or Firm* — Leason Ellis LLP

(57) ABSTRACT

A system and method apply an input noisy ultrasonic test (UT) scan image to an input layer of a convolutional neural network, generate a feature map using a convolutional layer, pool the feature map using a pooling layer, apply the pooled feature map to a fully connected layer, generate a de-noised UT scan image, and output the de-noised UT scan image from an output layer.

15 Claims, 4 Drawing Sheets

(56) References Cited

U.S. PATENT DOCUMENTS

| | | | |
|---|---|---|---|
| 9,976,967 | B2 | 5/2018 | Bense et al. |
| 10,811,151 | B2 | 10/2020 | Waite |
| 10,973,486 | B2 * | 4/2021 | Sjöstrand ............... A61B 6/467 |
| 11,078,631 | B2 | 8/2021 | Gilbert |
| 11,200,456 | B2 * | 12/2021 | Pinkovich .......... G06V 10/7747 |
| 2014/0216158 | A1 | 8/2014 | Sanabria Martin et al. |
| 2017/0262982 | A1 | 9/2017 | Pagoulatos et al. |
| 2018/0028153 | A1 * | 2/2018 | Kuroiwa .................. A61B 8/14 |
| 2018/0247227 | A1 * | 8/2018 | Holtham ............ G06V 30/1914 |
| 2019/0015052 | A1 | 1/2019 | Scalzo et al. |
| 2019/0065884 | A1 * | 2/2019 | Li .......................... G06V 10/25 |
| 2019/0261956 | A1 | 8/2019 | Srinivasan et al. |
| 2019/0323993 | A1 | 10/2019 | Mendes Rodrigues et al. |
| 2020/0160509 | A1 * | 5/2020 | Pack ...................... G16H 30/40 |
| 2021/0340857 | A1 | 11/2021 | Mohamed Shibly et al. |
| 2022/0018811 | A1 * | 1/2022 | Al-Hashmy ............. G06N 3/08 |
| 2022/0019190 | A1 * | 1/2022 | Mohamed Shibly ........................ G01N 29/0645 |
| 2022/0207691 | A1 | 6/2022 | Kumar |

FOREIGN PATENT DOCUMENTS

| | | |
|---|---|---|
| KR | 20180117009 A | 10/2018 |
| TW | M551477 U | 11/2017 |
| WO | 2018140874 A1 | 8/2018 |
| WO | 2019118613 A1 | 6/2019 |

OTHER PUBLICATIONS

S. Li, B. Fu, J. Wei, Y. Lv, Q. Wang and J. Tu, "Ultrasonic Logging Image Denoising Based on CNN and Feature Attention," in IEEE Access, vol. 9, pp. 116845-116856, 2021, doi: 10.1109/ACCESS.2021.3106020. (Year: 2021).*

Reza et al, Edge-preserving image denoising using a deep convolutional neural network, Signal Processing, vol. 159, Jun. 2019, pp. 20-32 (Year: 2019).*

Virkkunen et al, Augmented Ultrasonic Data for Machine Learning, https://arxiv.org/abs/1903.11399, Mar. 26, 2019 (Year: 2019).*

Kuo et al, Convolutional Autoencoders for Image NoiseReduction, https://towardsdatascience.com/convolutional-autoencoders-for-image-noise-reduction-32fce9fc1763, Nov. 20, 2019 (Year: 2019).*

Kondo, Ruho, et al. "Microstructure recognition using convolutional neural networks for prediction of ionic conductivity in ceramics " Acta Materialia 141 (2017): 29-38.

LeCun, Yann, et al. "Object recognition with gradient-based learning." Shape, contour and grouping in computer vision. Springer, Berlin, Heidelberg, 1999. 319-345.

Lin, M., Chen, Q., & Yan, S. (2014). Network in network. 2nd International Conference on Learning Representations, ICLR.

Zhang, Ni, et al. "Skin cancer diagnosis based on optimized convolutional neural network." Artificial intelligence in medicine 102 (2020): 101756.

Ye, Jiaxing et al., "Computerized ultrasonic imaging inspection: From shallow to deep learning." Sensors 18.11 (2018): 3820.

LeCun, Yann et al., "Deep learning." nature 521.7553 (2015): 436-444.

LeCun, Yann, et al. "Gradient-based learning applied to document recognition." Proceedings of the IEEE 86.11 (1998): 2278-2324.

Liu, Shengfeng, et al. "Deep learning in medical ultrasound analysis: a review." Engineering 5.2 (2019): 261-275.

Mocan, Ioana, et al. "Automatic Detection of Tumor Cells in Microscopic Images of Unstained Blood using Convolutional Neural Networks." 2018 IEEE 14th International Conference on Intelligent Computer Communication and Processing (ICCP). IEEE, 2018.

Shrifan, Nawaf et al., "Prospect of using ai Uncial intelligence for microwave nondestructive testing technique: A review." IEEE Access 7 (2019): 110628-110650.

Fowler, Timothy, et al. "Inspecting FRP composite structures with nondestructive testing." Work 1 (1892).

Munir, Nauman, et al. "Performance enhancement of convolutional neural network for ultrasonic flaw classification by adopting autoencoder." NDT & E International 111 (2020): 102218.

Jedrusiak, Mikel David. "A Deep Learning Approach for Denoising Air-Coupled Ultrasonic Responds Data." International Journal of Artificial Intelligence and Applications (IJAIA) 11.4 (2020).

Mohamadi, Sara et al., "Fusion and Visualization of Bridge Deck Nondestructive Evaluation Data via Machine Learning." Frontiers in Materials 7 (2020): 392.

Awasthi, Navchetan, et al. "Sinogram super-resolution and denoising convolutional neural network (SRCN) for limited data photoacoustic tomography." arXiv preprint arXiv:2001.06434 (2020).

Hendriksen, Allard Adriaan et al., "Noise2Inverse: Self-supervised deep convolutional denoising for tomography." IEEE Transactions on Computational Imaging 6 (2020): 1320-1335.

Kaur, Prabhpreet et al., "A review of denoising medical images using machine learning approaches." Current medical imaging 14.5 (2018): 675-685.

Yu, Houqiang, et al. "PCANet based nonlocal means method for speckle noise removal in ultrasound images." PloS one 13.10 (2018): e0205390.

Koziarski, Michal et al. , "Deep neural image denoising." International Conference on Computer Vision and Graphics. Springer, Cham, 2016.

Wu, Jinlong et al.,. "Seeing permeability from images: fast prediction with convolutional neural networks." Science bulletin 63.18 (2018): 1215-1222.

Bratlain, L.J., Telfer, B.A., Dhyani, M. (2018). Machine learning for medical ullrasound: status, methods, and future opportunities. Abdom Radiol. vol. 43, 786-799.

Ha et al.; Autoencoder-based detection of near-surface defects in ultrasonic testing; https://www.sciencedirect.com/science/article/pii/S0041624X21002547; Feb. 1, 2022; 10 pages.

Peng et al.; Detection method for surface scratches of composite automotive components with high reflection and complicated background color; Apr. 1, 2022; 11 pages.

* cited by examiner

SYSTEM AND METHOD FOR DE-NOISING AN ULTRASONIC SCAN IMAGE USING A CONVOLUTIONAL NEURAL NETWORK

FIELD OF THE DISCLOSURE

The present disclosure relates generally to image processing to remove noise from an image, and, more particularly, to a convolutional neural network for de-noising a noisy ultrasonic test (UT) scan image.

BACKGROUND OF THE DISCLOSURE

Ultrasonic testing is an established method of non-invasive evaluation of structures, such as pipes, tanks, pressure vessels, and offshore/onshore structures in the oil and gas industry. Ultrasonic testing of structures contributes to increased safety during inspections, with lower cost and higher speed of execution in many fields including but not limited to the oil and gas industry. In addition to the oil and gas industry, other industries can benefit from utilizing composite structures, such as aerospace structures, marine structures, building structures and/or any like structures. However, when testing structures formed from composite materials, the use of lower quality polymers in such composite materials containing a large number of internal defects and voids results in significant ultrasonic signal attenuation. This attenuation typically renders ultrasonic images of composite parts noisy and incoherent. Accordingly, the use of ultrasonics as an inspection technique for composite structures has had limited effectiveness.

SUMMARY OF THE DISCLOSURE

According to an embodiment consistent with the present disclosure, a system and method use a convolutional neural network to remove noise from a noisy ultrasonic test (UT) scan image. The convolutional neural network includes an input layer, a convolutional layer, a pooling layer, a fully connected layer, and an output layer.

In an embodiment, a system comprises an input device, a processor, and an output device. The input device is configured to receive a noisy UT scan image. The processor is configured by code executing therein to implement a convolutional neural network including a convolutional layer configured to generate a feature map from the noisy UT scan image, a pooling layer configured to sub-sample the feature map, and a fully connected layer configured to generate a de-noised UT scan image from the sub-sampled feature map. The output device is configured to output the de-noised UT scan image. The convolutional neural network is trained by an inputted training UT scan image. The trained convolutional neural network de-noises the noisy UT scan image. The convolutional layer includes a linear filter configured to extract features from the noisy UT scan image to generate the feature map. The convolutional layer applies a kernel across the noisy UT scan image to generate the feature map. The pooling layer applies maximum pooling to the feature map. The convolutional neural network further comprises an input layer configured to receive the noisy UT scan image from the input device. The convolutional neural network also further comprises an output layer configured to output the de-noised UT scan image to the output device. The output device displays a user interface to a user, with the user interface configured to receive the noisy UT scan image from the user.

In one or more embodiments consistent with the above, the de-noised UT scan image is saved to a storage device. In further aspects, a register is updated so that requests provided through the system for retrieval of the UT scan image default to retrieving the de-noised UT scan image instead of the noisy UT scan image, while the noisy UT scan image is optionally saved as well.

In another embodiment, a convolutional neural network comprises a convolutional layer configured to generate a feature map from a noisy UT scan image, a pooling layer configured to sub-sample the feature map, and a fully connected layer configured to generate a de-noised UT scan image from the sub-sampled feature map. The convolutional neural network is trained by an inputted training UT scan image. The trained convolutional neural network de-noises the noisy UT scan image. The convolutional layer includes a linear filter configured to extract features from the noisy UT scan image to generate the feature map. The convolutional layer applies a kernel across the noisy UT scan image to generate the feature map. The pooling layer applies maximum pooling to the feature map. The convolutional neural network further comprises an input layer configured to receive the noisy UT scan image from an input device. The convolutional neural network also further comprises an output layer configured to output the de-noised UT scan image to an output device.

As noted above, in one or more embodiments of a convolution neural network constructed consistent with the foregoing, the de-noised UT scan image is saved to a storage device. In further aspects, a register is updated so that requests provided through the system for retrieval of the UT scan image default to retrieving the de-noised UT scan image instead of the noisy UT scan image, while the noisy UT scan image is optionally saved as well.

In a further embodiment, a method comprises applying an input noisy ultrasonic test (UT) scan image to an input layer of a convolutional neural network, generating a feature map using a convolutional layer of the convolutional neural network, pooling the feature map using a pooling layer of the convolutional neural network, applying the pooled feature map to a fully connected layer of the convolutional neural network, generating a de-noised UT scan image, and outputting the de-noised UT scan image from an output layer of the convolutional neural network. The pooling includes sub-sampling the feature map. The method further comprises, prior to applying the input noisy ultrasonic test (UT) scan image, training the convolutional neural network using a training UT scan image.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION OF CERTAIN EMBODIMENTS OF THE DISCLOSURE

Example embodiments consistent with the teachings included in the present disclosure are directed to system and method use a convolutional neural network to remove noise from a noisy ultrasonic test (UT) scan image.

Figure 1:
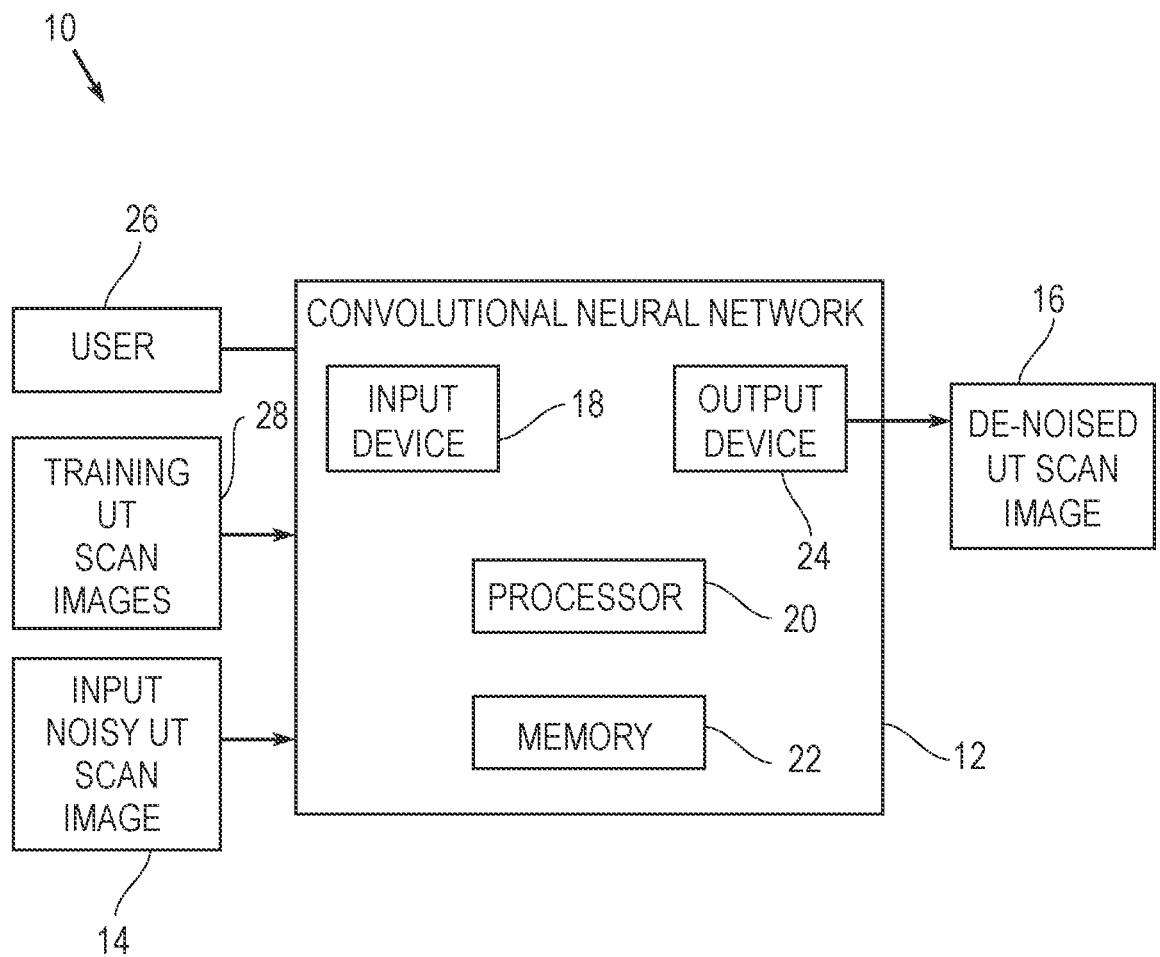
FIG. 1 is a diagram of a system employing a convolutional neural network, according to an embodiment.

As shown in FIG. 1, a system 10 according to an embodiment employs a convolutional neural network 12 configured to perform de-noising of an input noisy UT scan image 14 and to generate a corresponding de-noised UT scan image 16. The convolutional neural network 12 includes an input device 18, a processor 20 configured by code executing therein, a memory 22, and an output device 24.

The input device 18 receives inputs from a user 26, such as the input noisy UT scan image 14, as well as training UT scan images 28 which are used to train the convolutional neural network 12 to perform the de-noising. The input device 18 can be a display screen providing a user interface (UI), such as a graphical user interface (GUI). The UI allows the user 26 to upload the images 14, 28 in the form of data files from a data source, such as an external memory device or a network. The network can include the Internet. The output device 24 outputs the generated de-noised UT scan image 16, for example, to the user 26 in the form of an image displayed on a display screen. For example, the output device 24 can include the GUI. Accordingly, the input device 18 and the output device 24 can be the same device. For example, the combined devices 18, 24 can be a display. The display can include a touchscreen. Alternatively, the output device 24 can be a printer configured to print the de-noised UT scan image 16. In a further embodiment, the output device 24 can output the image 16 as a data structure such as a computer file. The computer file representing the image 16 can be stored in the memory 22. Alternatively, the computer file can be transmitted to another system or apparatus over a network. The network can include the Internet. As such, the de-noised UT scan image 16 can be saved to the memory 22 or to a storage device such as the computer file for retrieval in response to a request for the image. The system can have a registry that manages requests provided thereto for retrieval of the UT scan image so as to default retrieving the de-noised UT scan image instead of the noisy UT scan image, while the noisy UT scan image is optionally saved as well to the memory or to a computer file.

Figure 2:
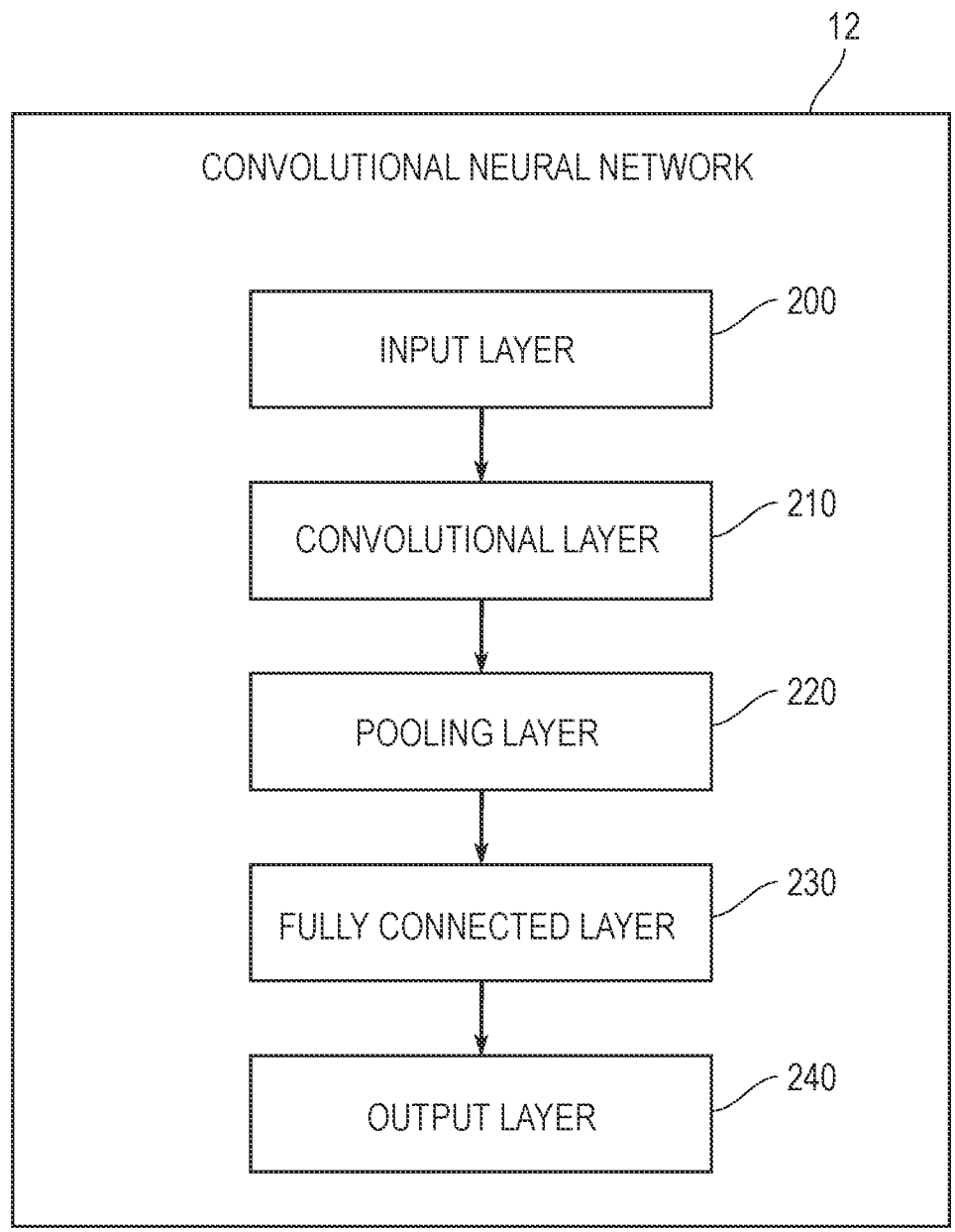
FIG. 2 is a diagram of the convolutional neural network of FIG. 1 in greater detail.

As shown in FIG. 2, the convolutional neural network 12 has an input layer 200, a convolutional layer 210, a pooling layer 220, a fully connected layer 230, and an output layer 240. Each of the layers 200, 210, 220, 230, 240 can be implemented as hardware included in the processor 20. Alternatively, the layers 200, 210, 220, 230, 240 can be implemented as data structures in a memory of the processor 20. In a further embodiment, the layers 200, 210, 220, 230, 240 can be implemented as data structures in the memory 22 which are processed by the processor 20. For example, the processor 20 is configured by code executing therein to implement each respective layer 200, 210, 220, 230, 240.

Figure 3:
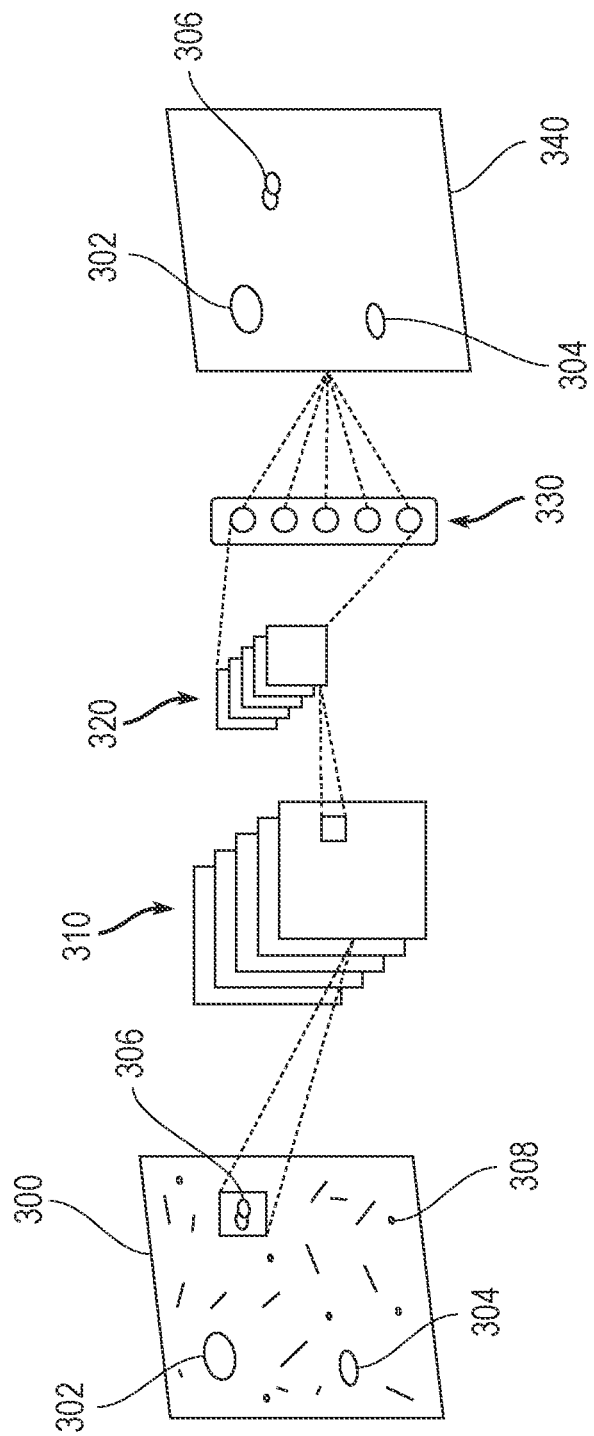
FIG. 3 is a diagram illustrating de-noising of an ultrasonic test scan image.

Referring to FIG. 3, the noisy UT scan image 300 is input to the input layer 200, for example, by a connection to the input device 18. The noisy UT scan image 300 is stored in the memory 22. At least one feature 302, 304, 306 is included in the image 300 along with at least one artifact 308 which constitutes noise. The noisy UT scan image 300 is then applied to the convolutional layer 210 to generate at least one feature map 310. For example, the processor 20 is configured by code executing therein to generate the at least one feature map 310 from convolution of the pixels of the image 300. The at least one feature map 310 can be stored in the memory 22. In an example embodiment, the convolutional layer 210 includes a linear filter to perform the convolution. The linear filter is configured to extract features from the noisy UT scan image 300 to generate the at least one feature map 310. In another example embodiment, the convolutional layer 210 applies a kernel across the noisy UT scan image 300 to generate the at least one feature map 310. The linear filter can be a learnable filter. The learnable filter can detect edges and corners in the image 300 using a kernel, in which a kernel is a small array of numbers applied across the input image 300. Each filter in the convolution layer 210 is a hidden neuron in the next layer of the convolutional neural network 12. The convolutional layer 210 filters the input image 300 with a smaller pixel filter to reduce the size of the image without losing the relationship between the original pixels.

The pooling layer 220 then sub-samples the at least one feature map 210 to generate a sub-sampled feature map 320. For example, the processor 20 is configured by code executing therein to perform pooling of layers of data in the feature map 210 to reduce the dimensions of the data by combining the outputs of neuron clusters at the convolution layer 210 into a single neuron in the pooling layer 220. The sub-sampled feature map 320 can be stored in the memory 22. In an example embodiment, the pooling layer 220 applies maximum pooling to the at least one feature map 310. With maximum pooling, the processor 20 determines the maximum value of each local cluster of neurons in the at least one feature map 310.

The sub-sampled feature map 320 is applied to the fully connected layer 230 having a plurality of neurons 330 which classify the features 302, 304, 306 of the sub-sampled feature map 320; for example, to distinguish distinct features 302, 304, 306 from noise 308. At the fully connected layer 230, the processor 20 is configured by code executing therein to classify the distinct features 302, 304, 306 from the noise 308. The classified features 302, 304, 306 are collected to be a de-noised UT scan image 340 which is output by the output layer 240. The processor 20 is configured by code executing therein to collect the classified features 302, 304, 306 into the de-noised UT scan image 340. The de-noised UT scan image 340 is stored in the memory 22 as the image 16 for subsequent output by the output layer 240 connected to the output device 24.

Figure 4:
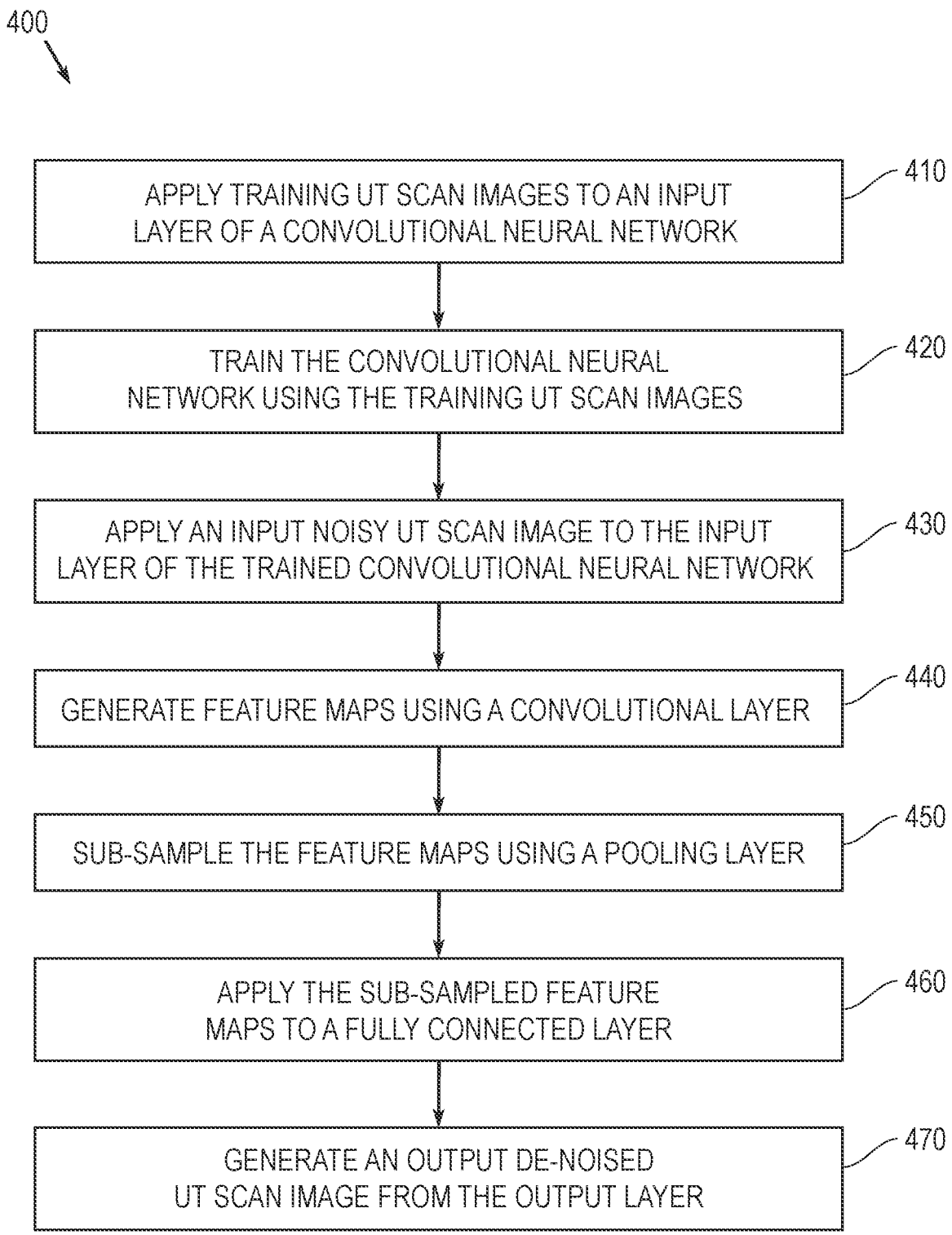
FIG. 4 is a flowchart of a method, according to the embodiment.

As shown in FIG. 4, a method 400 according to the embodiment includes the steps of applying the training UT scan images 28 to the input layer 200 of the convolutional neural network 12 in step 410, and training the convolutional neural network 12 using the training UT scan images 28 in step 420. The convolutional neural network 12 is trained by inputting the training set of UT scan images 28 to the input device 18, and generating de-noised UT scan images 16 corresponding to the input image 28 until a desired performance is achieved. For example, referring to FIG. 3, an input image 28 can have three distinct image features 302, 304, 306 among noise 308. The corresponding de-noised image 340 has only the distinct image features 302, 304, 306. During training, the desired performance can include detecting only the distinct image features 302, 304, 306 without any noise 308 in the output de-noised image 340.

Once the convolutional neural network 12 is trained, a noisy UT scan image 14 is input to the input layer 200 in step 430, and the convolutional layer 210 generates a feature map in step 440. The feature map is then sub-sampled by the pooling layer 220 in step 450, and the sub-sampled feature map is applied to the fully connected layer 230 in step 460. The fully connected layer 230 classifies the sub-sampled feature map to generate and output the de-noised UT scan image 16 in step 470 to be output by the output layer 240.

Portions of the methods described herein can be performed by software or firmware in machine readable form on a tangible (e.g., non-transitory) storage medium. For example, the software or firmware can be in the form of a computer program including computer program code adapted to cause the convolutional neural network 10 to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
an input device configured to receive a training ultrasonic test (UT) scan image and a noisy ultrasonic test (UT) scan image;
a processor configured by code executing therein to implement a convolutional neural network trained by the inputted training UT scan image, and including:
an input layer configured to receive the inputted training UT scan image and the noisy UT scan image;
a convolutional layer configured to receive the noisy UT scan image and to generate a feature map from the noisy UT scan image;
a pooling layer configured to sub-sample the feature map; and
a fully connected layer configured to generate a de-noised UT scan image from the sub-sampled feature map; and
an output device configured to output the de-noised UT scan image.

2. The system of claim 1, wherein the trained convolutional neural network de-noises the noisy UT scan image.

3. The system of claim 1, wherein the convolutional layer includes a linear filter configured to extract features from the noisy UT scan image to generate the feature map.

4. The system of claim 1, wherein the convolutional layer applies a kernel across the noisy UT scan image to generate the feature map.

5. The system of claim 1, wherein the pooling layer applies maximum pooling to the feature map.

6. The system of claim 1, wherein the convolutional neural network further comprises:
an output layer configured to output the de-noised UT scan image to the output device.

7. The system of claim 1, wherein the output device displays a user interface to a user, with the user interface configured to receive the noisy UT scan image from the user.

8. A convolutional neural network, comprising:
an input layer configured to receive a training ultrasonic (UT) scan image and a noisy UT scan image from an input device;
a convolutional layer configured to receive a noisy ultrasonic test (UT) scan image and to generate a feature map from the noisy UT scan image;
a pooling layer configured to sub-sample the feature map; and
a fully connected layer configured to generate a de-noised UT scan image from the sub-sampled feature map,
wherein the convolutional neural network is trained by the inputted training UT scan image.

9. The convolutional neural network of claim 8, wherein the trained convolutional neural network de-noises the noisy UT scan image.

10. The convolutional neural network of claim 8, wherein the convolutional layer includes a linear filter configured to extract features from the noisy UT scan image to generate the feature map.

11. The convolutional neural network of claim 8, wherein the convolutional layer applies a kernel across the noisy UT scan image to generate the feature map.

12. The convolutional neural network of claim 8, wherein the pooling layer applies maximum pooling to the feature map.

13. The convolutional neural network of claim 8, further comprising:
an output layer configured to output the de-noised UT scan image to an output device.

14. A method, comprising:
receiving a training ultrasonic test (UT) scan image and a noisy UT scan image at an input layer of a convolutional neural network;
training the convolutional neural network using the training UT scan image;
applying the received noisy ultrasonic test (UT) scan image to the input layer of the convolutional neural network;
receiving the noisy UT scan image at a convolutional layer of the convolutional neural network;
generating a feature map using the convolutional layer of the convolutional neural network;
pooling the feature map using a pooling layer of the convolutional neural network;
applying the pooled feature map to a fully connected layer of the convolutional neural network;
generating a de-noised UT scan image using the fully connected layer; and
outputting the de-noised UT scan image from an output layer of the convolutional neural network.

15. The method of claim 14, wherein the pooling includes:
sub-sampling the feature map.

* * * * *